3,310,509
REFORMED DYEABLE POLYOLEFIN COMPOSITION CONTAINING (1) A POLYOLEFIN CONTAINING TRANSITION METAL, (2) ORGANIC TIN COMPOUNDS AND (3) OPTIONALLY AN ALKYLPHENOL TYPE ANTIOXIDANT
Osamu Fukumoto and Masayoshi Kubo, Ohtsu-shi, and Hiroshi Hatakeyama, Kyoto, Japan, assignors to Toyo Rayon Kabushiki Kaisha, Tokyo, Japan
No Drawing. Filed June 2, 1964, Ser. No. 372,090
Claims priority, application Japan, June 7, 1963, 38/29,266; June 21, 1963, 38/31,143; Feb. 5, 1964, 39/5,712; Feb. 24, 1964, 39/9,250
15 Claims. (Cl. 260—23)

This invention relates to reformed dyeable polyolefin compositions and, in particular, to dyeable polyolefin compositions of improved stability against discoloration by heat and light and to a process for producing shaped articles therefrom.

While polyolefins have excellent physical and chemical properties on one hand, on the other, in view of the fact that they essentially lack radicals having affinity for dyestuffs, they are difficult to dye with the usual dyestuffs or dyeing procedures. Even if they are dyed using oil type dyestuffs, their fastness, for example, to such as dry cleaning, as well as gas and light is low. Thus, they cannot possibly be dyed with serviceable results.

Such being the case, there have been numerous proposals in the past which have had as their object the imparting of dyeability to polyolefins. One of these known processes is to blend in with the polyolefins a transition metal compound as the dye bonding medium. The polyolefin blended with such a transition metal compound can be readily dyed with the dyestuff which can produce its color by chelating with said transition metal compound. These processes have already been proposed by such as Japanese Official Patent Gazette, Publication No. 4,477/1963, U.S. Patent 2,984,634, Japanese Official Patent Gazette, publication No. 15,466/1962, and Belgium Patents 617,280, 614,776, 632,653 and 632,652, and are considered to be promising.

Of these metal compounds, however, the transition metal compounds of particularly Groups Ib, IIb, and 4th series of Group VIII of the periodic table, when blended with the polyolefins, exhibit a color tone characteristic of the ions of the particular metal, such as blue, green, purple, brown,-etc. Further, when the polyloefins are to be molded by melting, the transition metal compounds are readily susceptible to decomposition by oxidation as a result of their being heated in the molten polymer and thus it is usual that they are susceptible to considerable heat discoloration. Hence, their serviceability is greatly impaired.

We found that the foregoing heat discoloration could be completely prevented if, prior to the melting and molding of a polyolefin containing as a dye bonding medium at least one member selected from the group consisting of the compounds of the transition metals of Groups Ib, IIb and the 4th period of Group VIII, a small quantity of a specific tin compound is incorporated in said polyolefins.

A primary object of the present invention is to provide polyolefin compositions and dyeable shaped articles molded therefrom in which the heat discoloration of the polyolefin containing such transition metal compounds as a dye bonding medium is radically prevented.

On the other hand, polyolefins have a serious defect in that they are degraded relatively easily and in a short period of time by means of ultraviolet rays. For improving on this defect, proposals have been made to date of adding various photostabilizers. There is however naturally a limit to the performance of a stabilizer in those cases when only one constitutent has been added as the stabilizer and hence it was difficult to impart photostability which would give superior performance. On the other hand, though there have also been a number of methods proposed of the conjoint use of two or three constituents for the photostabilizer, as yet, the combination of constituents which would give fully satisfactory results has not been found.

We found that by further incorporating a small quantity of an alkylphenol type antioxidant in the hereinbefore mentioned composition comprising a transition metal compound-containing polyolefin and a specific organic tin compound, the three incorporated constituents other than the polyolefin would act synergistically and the photostability of the polyolefin would be enhanced tremendously.

Accordingly, a second object of the invention is to provide polyolefin compositions and dyeable shaped articles molded therefrom by provision of polyolefins containing a transition metal compound as a dye bonding medium in which the heat discoloration of said polyolefins is not only prevented but also their photostability is greatly enhanced.

The polyolefins to which the invention is applicable include the polymers and copolymers of alpha-olefins of two or more carbon atoms, or mixed compositions thereof with other high molecular weight substances in which the former predominates. Typical examples include the homopolymers of such as ethylene, propylene, 3-methylbutene-1,4-methylpentene-1 and 5-methylhexene-1, and the copolymers between these alpha-olefins as well as mixed compositions of these polymers and copolymers with different classes of polymers (e.g., such as polyesters, polyamides, polyureas, polyurethanes, epoxy resins and polycarbonates).

The transition metals of Groups Ib, IIb and the 4th period of Group VIII of the periodic table to be incorporated in the polyolefins as the dye bonding medium for imparting dyeability thereto are, as previously stated, known substances. They are exemplified by the following substances, which can all be used in this invention; namely, the aliphatic, alicyclic and aromatic monocarboxylates, dicarboxylates, oxycarboxylates, aminocarboxylates of copper, silver, zinc, cadmium, iron, cobalt and nickel, or the beta-diketone, beta-oxyketone and beta-ketonic acid ester complexes of the aforesaid metals. More specifically, if illustrated by means of nickel compounds, they are as follows: nickel cerotate, nickel lignoverate, nickel behenate, nickel arachidate, nickel stearate, nickel palmitate, nickel myristate, nickel laurate, nickel caprate, nickel caprylate, nickel caproate, nickel bonzoate, nickel p-dodecyl benzoate, nickel cyclohexylcarboxylate, nickel cyclopentylcarboxylate, nickel tetrahydrophthalate, nickel phthalate, nickel naphthenate, nickel isophthalate, nickel 1,2-cyclohexyldicarboxylate, nickel 1,3-cyclohexyldicarboxylate, nickel 1,2-cyclopentylenedicarboxylate, nickel 1,3-cyclopentyldicarboxylate, nickel maleate, nickel malonate, nickel dodecylsuccinate, nickel adipate, nickel sebacate, nickel 1,2-hydroxyoctadecanate, nickel octadecylaminopropionate, nickel hexadecylaminopropionate, nickel tetradecylaminopropionate, nickel dodecylaminopropionate, nickel decylaminopropionate, nickel octylaminopropionate, nickel hexylaminopropionate, nickel cyclohexylaminopropionate, nickel octadecylamino-1-methylpropionate, nickel tetradecylamino-1-methylpropionate, nickel dodecylamino-1-methylpropionate, nickel decylamino-1-methylpropionate, nickel octylamino-1-methylpropionate, nickel hexylamino-1-methylpropionate, nickel cyclohexylamino-1-methylpropionate, nickel octadecylamino-2-methylpropionate, nickel tetradecylamino-2-methylpropionate, nickel dodecylamino-2-methylpropionate, nickel decylamino-2-methylpropionate, nickel octylamino-2-methylpropionate, nickel hexylamino - 2 - methylpropionate, nickel cyclohexylamino - 2 - methylpropionate, nickel acetyl acetonate, nickel propionyl acetonate, nickel butyryl acetonate, nickel isobutyryl acetonate, nickel caproyl acetonate, nickel lauroyl acetonate, nickel dibenzoyl methane, nickel O-oxyacetophenone, nickel 1,3-cyclohexane diol, nickel ethyl acetoacetate, nickel butyl acetoacetate, nickel octyl acetoacetate, nickel lauryl acetoacetate, nickel isobutyl acetoacetate, nickel 4,4,4-trifluoroethyl acetoacetate, and nickel 4,4,4-trifluorobutyl acetoacetate. While the foregoing is merely an illustration of the compounds of nickel, needless to say, the corresponding compounds of copper, silver, zinc, cadmium, iron and cobalt can also be used.

The foregoing transition metal compounds are either added singly or in combination of two or more, and the amount added is normally from 0.02 to 2% in terms of the metallic constituent, based on the weight of the polyolefin.

The amount added of these transition metal compounds which become the dye bonding medium can be decided to some extent optionally within the foregoing range in consideration of various aspects such as the effects of dyeability imparted and moldability.

The specific organic tin compound to be incorporated for reforming the aforementioned transition metal compound-containing polyolefin is at least one of those represented by the following Formulas (I) to (V).

(I) 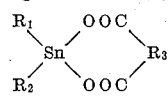

wherein $R_1$ and $R_2$ are alkyl radicals of 1–8 carbon atoms, $R_3$ is alkylene, alkenylene and arylene, or substituted modifications thereof.

(II) 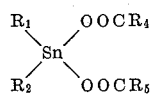

wherein $R_1$ and $R_2$ have the same meaning as above and —$OOCR_4$ and —$OOCR_5$ are either a saturated or unsaturated aliphatic mono- or dicarboxylic acid residue or a half ester residue of said dicarboxylic acid.

(III) 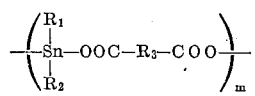

wherein $R_1$, $R_2$ and $R_3$ have the same meaning as above and $m$ is an integer of 2 or more.

(IV) 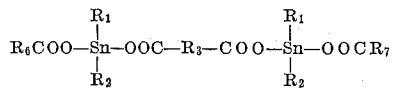

wherein $R_1$, $R_2$ and $R_3$ have the same meaning as above, and $R_6$ and $R_7$ are alkyl radicals of 1–8 carbon atoms.

(V) The reaction product (complex) of (a) 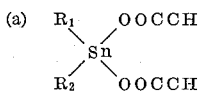 and (b) 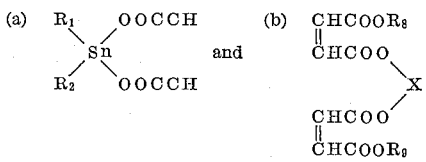

wherein $R_1$ and $R_2$ have the same meaning as above, $R_8$ and $R_9$ are alkyl radicals of 4–18 carbon atoms and X is an alkylene radical of 2–4 carbon atoms.

While all the organic tin compounds given above can be used effectively for achieving the ends desired of the present invention, those which gradually liberate organic acids during the heating and melting of the polyolefin manifest particularly excellent results, the dicarboxylic acid bonded dialkyl tin compounds being particularly effective in this respect. On the other hand, the mono-, tri- and tetraalkyl tin compounds being strongly toxic must not be used in this invention.

Specific examples of the tin compounds which are suitably used in the invention are given below.

Examples of the tin compounds represented by Formula I are as follows:

Di-n-butyl tin malonate, di-n-butyl tin succinate, di-n-butyl tin glutarate, di-tert-butyl tin adipate, di-tert-butyl suberate, di-n-butyl tin sebacate, di-n-butyl tin maleate, di-n-butyl tin phthalate, di-n-butyl tin isophthalate, di-n-octyl tin malonate, di-n-octyl tin maleate, di-n-octyl tin azelate, di-n-octyl tin pimelate, di-n-octyl tin oxalate, di-n-octyl tin sebacate, diisobutyl tin succinate, diisobutyl tin malonate, diisobutyl tin glutarate, diisobutyl tin adipate, diisobutyl tin suberate, diisobutyl tin sebacate, diisobutyl tin maleate, diisobutyl tin itaconate, diisobutyl tin phthalate, diisobutyl tin isophthalate, di(2-ethylhexyl) tin succinate, di(2-ethylhexyl) tin malonate, di(2-ethylhexyl) tin glutarate, di(2-ethylhexyl) tin adipate, di(2-ethylhexyl) tin suberate, di(2-ethylhexyl) tin sebacate, di(2-ethylhexyl) tin maleate, di(2-ethylhexyl) tin itaconate, di(2-ethylhexyl) tin phthalate, di(2-ethylhexyl) tin isophthalate, di(1,1,3,3-tetramethylbutyl) tin adipate, di(1,1,3,3-tetramethylbutyl) tin maleate, di(1,1,3,3 - tetramethylbutyl) tin phthalate; or di-n-butyl tin tetrahydrophthalate, di(tert-butyl) tin tetrahydrophthalate, di-n-octyl tin tetrahydrophthalate, di(2-ethylhexyl) tin tetrahydrophthalate, di(1,1,3,3-tetramethylbutyl) tin tetrahydrophthalate, di-n-butyl tin-1,2-cyclohexylenedicarbonate, dioctyl tin-1,2-cyclohexylenedicarbonate, dibutyl tin-1,3-cyclohexylenedicarbonate, dioctyl tin-1,3-cyclohexylenedicarbonate, dibutyl tin-1,3-cyclopentylenedicarbonate, dioctyl tin-1,3-cyclopentylenedicarbonate, dibutyl tin-3-cyclohexene-1,2-ylenedicarbonate, dioctyl tin - 3 - cyclohexene-1,2-ylenedicarbonate.

Examples of the tin compounds represented by Formula II are as follows:

Dibutyl tin distearate, dibutyl tin dipalmitate, dibutyl tin dimyristate, dibutyl tin laurate, dibutyl tin dicaprate, dibutyl tin dicaprylate, dibutyl tin dipropionate, dibutyl tin stearate-laurate, dibutyl tin laurate-caprate, dioctyl tin distearate, dioctyl tin dipalmitate, dioctyl tin dimyristate, dioctyl tin dilaurate, dioctyl tin dicaprate, dioctyl tin stearate-laurate, dioctyl tin laurate-caprate; or

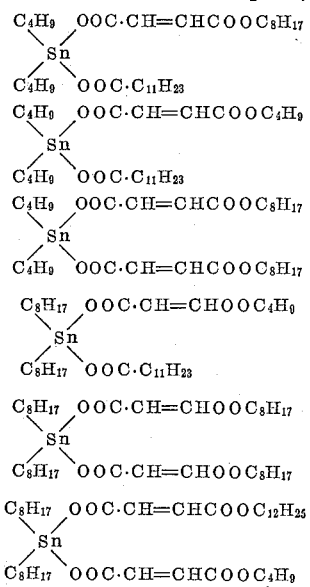

Examples of the tin compounds represented by Formula III are as follows:

Dibutyl tin maleate polymer, dioctyl tin maleate polymer, di(2-ethylhexyl) tin maleate polymer, dihexyl tin maleate polymer, dibutyl tin adipate polymer, dibutyl tin sebacate polymer, dibutyl tin succinate polymer, dioctyl tin adipate polymer, dioctyl tin sebacate polymer, dioctyl tin succinate polymer, dibutyl tin itaconate polymer, dioctyl tin itaconate polymer, di(2-ethylhexyl) tin itaconate polymer.

Examples of the tin compounds represented by Formula IV are as follows:

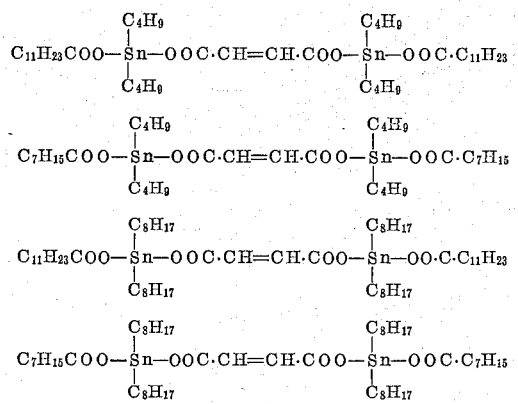

Examples of the tin compounds represented by Formula V are as follows:

The complex formed by the reaction between the compounds illustrated in (a) and (b), below.

Examples of (a) compounds:

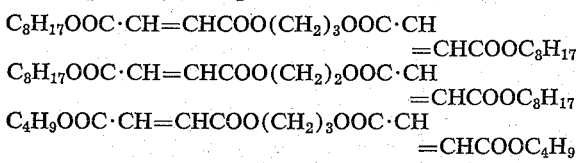

Example of (b) compounds:

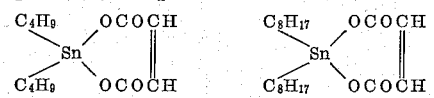

Although there are differences depending upon the class of these organic tin compounds, the desired results are brought about by the addition of a fairly small amount of these compounds. Based on the weight of the aforementioned transition metal compound-containing polyolefin, the amount added of the organic tin compound is suitably a range normally 0.002 to 2%, and particularly preferred is a range of 0.05 to 1.0%.

When the foregoing range is calculated in terms of the tin constituent, this becomes about 0.002 to 0.3% of the polyolefin weight. Hence, the amount preferably added is a range of about one tenth of that of the transition metal compound. If the organic tin compound is used greatly in excess of the transition metal compound in the polyolefin, the superior dyeability imparting effect of the compounds of the transition metals of Group Ib, IIb or the 4th period of Group VIII is impaired. With the setting up of a weak chelating bond between the dyestuff and the tin compound, not only is the state of coloration of the article to be dyed darkened excessively but also with the bond between the tin compound and dyestuff being weak a decline in the color fastness is brought about. Consequently, the tin compound used must not be in an amount in excess of that of the transition metal compound.

Conversely, when the tin compound is used in a minute amount of less than about one tenth of that of the transition metal compound, it goes without saying that the manifestation of such effects as the prevention of heat discoloration or the improvement in fastness to light will become difficult.

The organic tin compound used in this invention can be added to the transition metal-containing polyolefin by means of any customary procedure. For example, the procedure employed may be that in which the tin compound is added to powdered, granular or flakelike polyolefin which is then melt blended, or there is a procedure in which by using a suitable solvent of the polyolefin the two are mixed by dissolving in the solvent. It is, of course, also permissible to add both the organic tin compound and the transition metal compound to the polyolefin at the same time.

Heat discoloration does not occur in melt molding the invention composition obtained in this manner. Thus the resulting shaped articles such as fibers and films are dyed very excellently by those dyestuffs which can produce color by chelating with said transition metal compound. These results are very surprising when it is considered that if the melt molding of the polyolefin were to be carried out by mixing the aforesaid transition metal compound alone with the polyolefin the thermal decomposition of said transition metal compound would be so great that not only would the polyolefin be discolored but the improvement in dyeability would also be small.

Next, the alkylphenol type antioxidants that are incorporated in the polyolefins together with the hereinbefore described transition metal compounds and organic tin compounds for the purpose of imparting photostability according to this invention are those which have been used conventionally for imparting antioxidant properties to high molecular weight substances. Typical examples thereof include such as di-tert-butyl-p-cresol, 2,2'-methylene-bis(4 - methyl-6-tert-butylphenol), 4,4'-methylene-bis(2,6 - di - tert - butylphenol,) 4,4'-methylene-bis(2,6-di-tert-butylphenol), 2,6 - bis(2' - hydroxy-3'-tert-butyl-5'-methylbenzyl)-4-methylphenol, 1,1,3-tris(2 - methyl-4-hydroxy - 5 - tert-butylphenyl) butane, 2,2'-methylene-bis(4-methyl-6-cyclohexylphenol), 4,4'-methylene-bis (2-methyl-6 - tert-butylphenol), 6 - (4-hydroxy-3,5-di-tert-butylphenylcyclohexylamino) - 2,4-bis(n-octylthio)-1,3,5-triazine and (4-hydroxy-3,5-di-tert-butyl) benzylphosphonic acid di-n-octadecyl ester.

The foregoing alkylphenol type antioxidants used in this invention for the purpose of imparting photostability are added, based on the weight of the polyolefin, in an amount up to 0.5% normally, and preferably in a range of 0.05–0.5%. In this case, the other constituents to be added, i.e., the organic tin compound and the metallic constituent of the transition metal compound, are suitably added in a range of 0.5–1.0% for the former and 0.3–5.0% for the latter.

The transition metal compounds, which are used in this invention, when used alone, rather than becoming a photostabilizer of polyolefin, act to impair the latter's photostability but by their use with the other two constituents hereinbefore mentioned act for the first time synergistically.

It is in this respect that they differ entirely in their properties from the conventional stabilizers, and hence this must be regarded as being a truly unexpected effect.

The sequence in which the several constituents are mixed with the polyolefins can be chosen as one pleases, and it is of course permissible to mix them all at once.

That discoloration by heat does not occur in the so obtained invention composition when it is being melt molded and that the shaped articles obtained therefrom have excellent dyeability are already noted in the instance in which the alkylphenol type antioxidant was not added. Further, this shaped article is highly stable against ultraviolet rays.

In those cases in which it is not so strongly desired to impart the foregoing photostability to the invention composition, the addition of the alkylphenol type antioxidant may be omitted.

Other conventional additives as, for example, ultraviolet absorbers such as salicyclic acid ester benzophenone derivative, delustrants such as titanium dioxide and zinc sulfide, substances for imparting a bluish tinge such as phthalocyanine and fluorescent pigments, dispersing agents such as calcium stearate or the amine type antioxidants may also be contained in the composition of this invention. The excellent effects of the present invention are not impaired by these additives.

While the invention composition can be melt molded into shaped articles of varied shape, the characteristic that it is dyeable is most effectively manifested in particular when it is molded, for example, into fibers, bristles, guts, films or sheets.

The outstandingly valuable effects of the invention hereinbefore described in detail, when summarized, are as follows:

The first effect is that while polyolefins having two or more olefins as their constituent units normally exhibit a melting point of above 160° C., it is a usual practice to use an elevated temperature of at least 200–300° C. in melt molding them, since their melt viscosity is generally high. Thus, the organic transition metal compounds added for imparting dyeability, when heated for prolonged periods of time at elevated temperatures in molten polyolefins of above 200° C., readily become oxidized and decomposed in all instances to lose the color tone characteristic of the transition metal elements and turn brown or black while at the same time lose their ability to chelate with dyestuffs. On the other hand, when, in accordance with this invention, an organic tin compound is incorporated with the polyolefin when carrying out the melt molding operation, the heat decomposition of the organic transition metal is prevented and hence it becomes possible to check the undesirable discoloration as well as to prevent at the same time the loss of the dyeability imparting effect.

The second effect is that since the discoloration by heat of transition metal compound can be easily prevented according to this invention, thus making it possible to use any temperature above 200° C. (to be decided by the inherent viscosity of the polyolefin to which the invention is to be applied) most suited for the molding operation, the rate of operation can be enhanced notably without suffering any decline in the various processing properties of the shaped article, such as stretchability, etc.

Thirdly, since for preventing the decomposition and discoloration of the transition metal compounds, it was necessary in the past to employ the lowest possible temperature, drawbacks such as a decline in the performance, for example, the tenacity and elongation, of the resulting shaped articles followed. On the other hand, since, as previously indicated, according to this invention the optimum temperature for molding at about 200° C. can be chosen as one pleases, shaped articles possessing various excellent properties can be obtained.

Fourthly, by the further addition, as desired, of an alkylphenol type antioxidant besides the transition metal compound and organic tin compound and by synergistic action of these three constituents, a polyolefin shaped article having very marked photostability can be obtained.

For a clearer understanding of the invention, the following examples are given, it being understood that the invention is not to be limited thereby. Unless otherwise indicated, the parts and percentages in the examples are on a weight basis.

*Example 1*

To powdered isotactic polypropylene having an intrinsic viscosity of 1.53 (measured in tetralin at 135° C.) were added 3% of nickel stearate (M.P. 98° C.—nickel content 9.4%) and 0.5% of dibutyl tin maleate-laurate

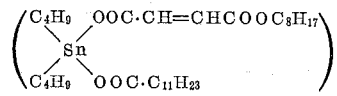

and after mixing the constituents in a Henschel mixer, the mixture was melted and kneaded at 200° C. in customary manner using a pelletizer. The resulting chips were melt spun by extrusion from a spinneret having 24 holes each 0.8 mm. in diameter at a spinning temperature of 240° C., followed by drawing over a heated plate 450% to obtain filaments which were knitted into knit fabric A. Filaments obtained under identical conditions except that the dibutyl tin maleate-laurate was not added were knitted into knit fabric B. The degree of whiteness of these knit fabrics A and B are shown in Table I.

TABLE I.—DEGREE OF WHITENESS (REFLECTANCE PERCENT)

| Sample | Wavelength, mμ | | | Color tone |
|---|---|---|---|---|
| | 400 | 440 | 480 | |
| A. Polypropylene containing 3% nickel stearate and 0.5% dibutyl tin maleate-laurate, in accordance with present invention. | 60.4 | 72.6 | 77.3 | Light green. |
| B. Polypropylene containing only the 3% nickel stearate. | 40.2 | 44.6 | 47.2 | Dark gray-black. |

*Example 2*

Example 1 was repeated except that instead of the nickel stearate and dibutyl tin maleate-laureate 3%, of copper stearate and 0.5% of dibutyl tin maleate were used, respectively. The reflectances of the knit fabric knitted from yarn A containing the aforesaid two constituents and that knitted from yarn B containing only the 3% of copper stearate are shown in Table II. As apparent from the results, a great difference in the reflectance of the two exists.

TABLE II.—DEGREE OF WHITENESS (REFLECTANCE PERCENT)

| Sample | Wavelength, mμ | | | Color tone |
|---|---|---|---|---|
| | 400 | 440 | 480 | |
| A. Polypropylene containing 3% copper stearate and 0.5% dibutyl tin maleate, in accordance with present invention. | 56.2 | 68.5 | 70.4 | Greenish tinge. |
| B. Polypropylene containing only the 3% copper stearate. | 38.2 | 40.0 | 42.6 | Dark red-brown. |

*Example 3*

Three parts of nickel stearate and 0.5 part of dibutyl tin sebacate were added to 96.5 parts of powdered isotactic polypropylene having an intrinsic viscosity of 1.53 (measured in tetralin at 135° C.), and the mixture was melted and kneaded in a pelletizer heated to 220° C. When a heat resistance test of the so obtained chips A was conducted by heating and melting them for 30 minutes in glass tubes wherein the air was replaced with nitrogen at the various temperatures of 220, 240, 250, 260, 270, 280 and 290° C., the same test being conducted on chips B prepared under identical conditions but not containing the dibutyl tin sebacate, results as shown in Table III were obtained.

TABLE III.—HEAT DISCOLORATION TEST (DWELL TIME, 30 MIN.)

| Melting temperature, ° C. | Sample A — According to present invention, polypropylene chips containing 3% nickel stearate and 0.5% dibutyl tin sebacate | Sample B — Polypropylene chips containing only the 3% nickel stearate |
|---|---|---|
| 220 | Light green | Light green. |
| 240 | do | Light yellow-green. |
| 250 | do | Gray-green. |
| 260 | do | Gray-black. |
| 270 | do | Do. |
| 280 | Gray-green | Black. |
| 290 | Gray-black | Do. |

Example 4

When Example 3 was repeated except that instead of the nickel stearate, nickel naphthenate was used, similar results were obtained.

Example 5

When chips C obtained by adding 3% of iron stearate to isotactic polypropylene having an intrinsic viscosity of 1.53, followed by melting and kneading, as in Example 3, and chips D obtained by adding 3% of iron stearate as well as 0.3% of dioctyl tin maleate and 0.3% of dioctyl tin adipate and likewise melting and kneading, as above, were heated in glass tubes wherein the air was replaced with nitrogen and held for 30 minutes therein at the various temperatures of 220, 240, 250, 260, 270, 280 and 290° C., the states of discoloration were as shown in Table IV. It was thus observed that the dialkyl tin carboxylates had remarkable heat discoloration preventive effects with respect to the colored metal compounds.

TABLE IV.—HEAT DISCOLORATION TEST RESULTS (DWELL TIME, 30 MIN)

| Melting temperature, ° C. | Sample C<br>Polypropylene chips containing 3% iron stearate | Sample D<br>According to present invention, polypropylene chips containing 3% iron stearate, 0.3% dioctyl tin meleate and 0.3% dioctyl tin adipate |
|---|---|---|
| 220 | Gold-brown | Gold. |
| 240 | Light brown | Gold-brown. |
| 250 | Brown | Do. |
| 260 | ...do | Do. |
| 270 | Black-brown | Light brown. |
| 280 | ...do | Do. |
| 290 | ...do | Do. |

Example 6

Example 5 was repeated except that instead of the dioctyl tin maleate and adipate, dibutyl tin phthalate was used. Similar effects were observed.

Example 7

To powdered isotactic poly-4-methylpentene-1 having an intrinsic viscosity of 1.87 (measured in tetralin at 135° C.) were added 3% of nickel octadecylamino-1-methylpropionate and as an antioxidant 0.2% of 1,1,3-tri(2-methyl-4-hydroxy-5-tert-butylphenyl) - butane, following which this mixture was melted in customary manner at 270° C. to prepare chips A.

By way of comparison, to the foregoing powdered composition A was added 0.5% of di(1,1,3,3-tetramethylbutyl) tin dilaurate, after which this mixture was melted and kneaded at 270° C., as in the case of A above, then extruded from an extruder and cut into given lengths to prepare chips B.

Chips A and B were then placed in test tubes and after replacement of the air with nitrogen heated respectively under vacuum for 30 minutes at the temperatures of 220, 240, 250, 260, 270, 280, 290 and 300° C. Whereas chip A turned black at 270° C., chip B containing di(1,1,3,3-tetramethylbutyl) tin dilaurate according to this invention, exhibited no discoloration due to heat even at 290° C. where it still maintained its bright green color, the point of heat discoloration being raised to 300° C.

Example 8

When di(1,1,3,3-tetramethylbutyl) tin tetrahydrophthalate was used instead of the di(1,1,3,3-tetramethylbutyl) tin dilaurate of the chips B in Example 7, pronounced decomposition preventive effects were exhibited similarly as in Example 7, no heat discoloration occurring even when the chips were heated to 300° C.

Example 9

To powdered isotactic polypropylene of 98% n-heptane insoluble portion and an intrinsic viscosity of 1.53 (measured in tetralin at 135° C.) was added 3% of zinc acetyl acetonate, after which by following customary procedures this mixture was melted at 205° C. and formed into transparent white chips A using an extruder.

On the other hand, by way of comparison, to the foregoing composition A was added further 0.5% of dibutyl tin maleate, after which this mixture was molded into chips B which were of semitransparent white color.

Chips A and B were then placed in test tubes and, as in Example 7, were heated for 30 minutes, after replacement of air with nitrogen, at the various temperatures indicated. The states of heat discoloration observed were as shown in Table V.

These results indicated that the heat discoloration of the chips B according to the present invention was very small, no heat discoloration occurring at all up to 280° C.; whereas chips A turned yellow-brown at 230° C.

TABLE V.—STATE OF HEAT DISCOLORATION

| Heating and melting temperature, ° C. | Sample A<br>Containing only the zinc acetyl acetonate | Sample B<br>According to the present invention, containing dibutyl tin maleate and zinc acetyl acetonate |
|---|---|---|
| 220 | White | White. |
| 230 | Yellow-brown | Do. |
| 240 | ...do | Do. |
| 250 | Light brown | Do. |
| 260 | ...do | Do. |
| 270 | ...do | Do. |
| 280 | ...do | Yellowish tinge. |
| 290 | Brown | Yellow-brown. |
| 300 | ...do | Do. |

Example 10

When 3% of zinc butyryl acetonate was added to isotactic polypropylene instead of the zinc acetyl acetonate in Example 9, the dibutyl tin maleate also exhibited excellent heat discoloration preventive effects. By the presence together of the dibutyl tin maleate, it was possible to raise the temperature at which discoloration starts, when heated for 30 minutes, from 230° to 290° C.

Example 11

With powdered isotactic polypropylene of 97.5% n-heptane insoluble portion and an intrinsic viscosity of 1.53 (measured in tetralin at 135° C.) were blended 3% of nickel octadecylaminopropionate and as an antioxidant 0.2% of 1,1,3-tri(2-methyl-4-hydroxy-5-tert-butylphenyl)-butane, the mixing being continued for 30 minutes using a Nauter mixer. The resulting powder A and a powder B consisting of the foregoing composition to which was further added 0.5% of dibutyl tin maleate-laurate were separately melted and kneaded in an extruder heated to 205° C. to yield strands which were cut in customary manner to obtain chips A' containing only the antioxidant and nickel octadecylaminopropionate and chips B' which contained further dibutyl tin maleate-laurate besides the foregoing composition.

When these two classes of chips were placed separately in test tubes, and, after replacement of air with nitrogen, heated under vacuum for 30 minutes at the various temperatures indicated in Table VI, chips A' turned black at 270° C., whereas chips B' did not turn black until it was heated to 300° C. As shown in Table VI, there was a significant difference in the heat resistance of the two chips A' and B'.

TABLE VI.—HEAT DISCOLORATION TEST (HEATING TIME 30 MIN.)

| Heating and melting temperature, °C. | Sample A'<br>Polypropylene containing only nickel octadecylaminopropionate | Sample B'<br>According to present invention, polypropylene containing nickel octadecylaminopropionate and dibutyl tin maleate-laurate |
|---|---|---|
| 220 | Green-blue | Green-blue. |
| 240 | do | Do. |
| 250 | do | Do. |
| 260 | do | Do. |
| 270 | Black | Do. |
| 280 | do | Do. |
| 290 | do | Do. |
| 300 | do | Black. |

*Example 12*

A powder obtained by blending, as in Example 11, with isotactic polypropylene of an n-heptane insoluble portion of 98% and an intrinsic viscosity of 1.45 (measured in tetralin at 135° C.) 0.2% of 1,1,3-tri(2-methyl-4-hydroxy-5-tert-butylphenyl)-butane and 3% of nickel octadecylamino-2-methyl propionate was mixed using a Nauter mixer. The so obtained powder A and a powder B obtained by adding further to the foregoing powder A 0.3% of dibutyl tin maleate-laurate were separately pelletized by heating and melting at 205° C. using an extruder to obtain chips which were designated respectively as chips A' and B'.

These chips were, as in Example 11, placed in separate test tubes and, after replacement of air with nitrogen, heated for 30 minutes at the various temperatures indicated in Table VII. In this test, chips A' heat discolored at 240° C., whereas chips B' had a heat discoloration temperature of 280° C. The results obtained are shown in Table VII.

TABLE VII

| Heated and melting temperature, °C. | Sample A'<br>Polypropylene containing only the nickel octadecylamino-2-methylpropionate | Sample B'<br>Polypropylene containing nickel octadecylamino-2-methylpropionate and dibutyl tin maleate-laurate |
|---|---|---|
| 220 | Green-white | Green-white. |
| 240 | Black | Do. |
| 250 | do | Do. |
| 260 | do | Do. |
| 270 | do | Do. |
| 280 | do | Gray-green. |
| 290 | do | Black. |
| 300 | do | Do. |

*Example 13*

When nickel octadecylamino-1-methylpropionate is used instead of the nickel octadecylaminopropionate and nickel octadecylamino-2-methylpropionate in Examples 11 and 12, the dibutyl tin maleate-laurate had similarly pronounced heat discoloration preventive effects as in Examples 11 and 12. Heat discoloration occurred at 300° C. when the nickel octadecylamino-1-methylpropionate was used alone, whereas when it was used together with the aforesaid dibutyl tin compound, the heat discoloration temperature was raised to 325° C.

*Example 14*

Blue-green chips A obtained by pelletizing medium pressure process polyethylene powder having an intrinsic viscosity of 1.85 (measured in tetralin at 135° C.) after having added thereto 3% copper dodecylaminopropionate and blue-green chips B obtained in a similar manner after having added to the foregoing polyethylene powder 3% of copper dodecylaminopropionate and 0.5% of dioctyl tin adipate were heated for 30 minutes at the various temperatures as in Examples 11 and 12. Whereas chips A turned green-brown at 220° C., chips containing the dioctyl tin adipate according to this invention had a heat discoloration temperature of 250° C., thus exhibiting a great difference.

*Example 15*

Zinc hexadecylamino-1-methylpropionate was added to isotactic poly-4-methylpentene-1 of an n-heptane insoluble portion of 92.5% and an intrinsic viscosity of 2.13 (measured in tetralin at 135° C.) and the mixture was melted at 280° C. using an extruder. The strand obtained therefrom was cut into chips which were remelted and spun by being extruded in customary manner from a spinneret having 12 holes 0.8 mm. in diameter, followed by winding up while cooling to obtain yarn A.

By adding further to the foregoing composition 0.5% of a reaction product obtained by reacting the dibutyl tin maleate according to this invention with an ester having the formula shown below and spinning by the same procedure described hereinabove, yarn B was obtained:

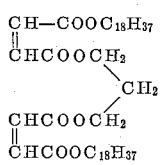

Table VIII shows the degree of whiteness of these yarns. Yarn B according to this invention had a higher reflectance than that of yarn A, thus showing an improvement in its degree of whiteness.

TABLE VIII.—DEGREE OF WHITENESS (REFLECTANCE PERCENT)

| Sample | Wavelength, mμ | | | Color tone |
|---|---|---|---|---|
| | 400 | 440 | 480 | |
| A. poly-4-methylpentene-1 containing only the zinc hexadecylamino-1-methylpropionate. | 70 | 75 | 80 | Yellow-brown. |
| B. poly-4-methylpentene-1 containing the dibutyl tin compound according to this invention and zinc hexadecylamino-1-methylpropionate. | 79 | 86 | 91 | White-yellow. |

*Example 16*

With powdered isotactic polypropylene of an n-heptane insoluble portion of 98.2% and an intrinsic viscosity of 1.53 (measured in tetralin at 135° C.) was blended 3% of nickel octylamino-2-methylpropionate, after which the mixture was pelletized at 205° C. in customary manner. When the chips A so obtained were placed in test tubes and, after replacing air with nitrogen, heated at various temperatures, these chips A turned black after heating for 5 minutes at 220° C.

On the other hand, when further incorporation of 0.5% of dibutyl tin succinate was made in the foregoing chips A and the same test was conducted, no discoloration occurred even after heating for 45 minutes.

*Example 17*

To isotactic polypropylene of a hot n-heptane insoluble portion of 95% and an intrinsic viscosity of 1.43 were added 0.15% of 1,1,3-tri(2-methyl-4-hydroxy-5-tert-butylphenyl)-butane, 0.3% of dibutyl tin maleate-laurate and 3% of nickel stearate, following which the mixture was mixed by melting for 15 minutes at 200° C. This stabilized polypropylene was then remelted and spun to yield a monofilament of about 20 deniers. This monofilament exhibited only a light green-blue color which is characteristic of nickel stearate, there being no heat discoloration during the melt blending operation and the remelting operation for carrying out the spinning. This sample was subjected to ultraviolet irradiation in the Weather-O meter (Toyo Rika Co., Model WE-2) at 65° C. It took 220 hours for the intrinsic viscosity of this sample to become 80% of its original intrinsic viscosity.

In contrast, this time for a monofilament not containing nickel stearate was 100 hours. The numerical values illustrating the synergistic effects of the stabilizer system of the present invention are summarized in Table IX.

TABLE IX.—TIME REQUIRED FOR THE INTRINSIC VISCOSITY TO BECOME 80% OF ORIGINAL VALUE BY IRRADIATION WITH WEATHER METER

| No.* | Composition of additive | Time for inherent viscosity to become 80%, hr. | Color tone of monofils |
|---|---|---|---|
| I | 0.15% of 1,1,3-tri(2-methyl-4-hydroxy-5-tert-butylphenyl)-butane. | 60 | White transparent. |
| II | 0.3% of dibutyl tin maleate-laurate. | 60 | Light white-yellow transparent. |
| III | 3% of nickel stearate | 20 | Light yellow-green transparent. |
| | I+II | 100 | White transparent. |
| | I+III | 80 | Light yellow-green. |
| | II+III | 90 | Light green. |
| | I+II+III | 220 | Light blue-green. |

*The Roman numerals herein are for simplifying the descriptions of additives used. The same numerals are used in common in the examples given hereinafter.

*Example 18*

When zinc stearate was used instead of the nickel stearate in Example 17, substantially similar results were obtained. While with the use of composition III the monofilaments were tinged with a yellow-brown color, with the use of compositions II plus III and I plus II plus III the monofilaments became white and transparent.

*Example 19*

When bright green-white monofilaments prepared by mixing, as in Example 17, 0.15% of 1,1,3-tri(2-methyl-4-hydroxy-5-tert-butylphenyl)-butane, 0.3% of dibutyl tin bismonolaurylmaleate and 3% of nickel stearate was subjected to an irradiation of ultraviolet rays in a weather meter, it took 200 hours for the intrinsic viscosity to become 80% of its original value. In Table X are given the numerical value illustrating the synergistic effect of the stabilizer of this invention.

TABLE X

| No. | Stabilizer composition | Time required for inherent viscosity to become 80%, hr. | Color tone of monofils |
|---|---|---|---|
| IV | 0.3% of dibutyl tin bismonolaurylmaleate. | 50 | Ivory-white. |
| | I+IV | 90 | White. |
| | III+IV | 90 | Light green. |
| | I+III+IV | 200 | Light blue-green. |

*Example 20*

When 4,4'-butylidene bis(3-methyl-6-tert-butylphenol) was used instead of the 1,1,3-tri(2-methyl-4-hydroxy-5-tert-butylphenyl)-butane in Example 17, substantially similar results were obtained, as shown in Table XI.

TABLE XI

| No. | Stabilizer Composition | Time required for inherent viscosity to become 80%, hr. |
|---|---|---|
| V | 0.2% of 4,4'-butylidene bis (3-methyl-6 tert-butylphenol). | 70 |
| | II+III+V | 230 |

*Example 21*

To isotactic polypropylene of a hot heptane insoluble portion of 95% and an intrinsic viscosity of 1.43 were added 0.15% of 1,1,3-tri(2-methyl-4-hydroxy-5-tert-butylphenyl)-butane, 0.3% of a complex of dibutyl tin maleate and an ester of the following formula

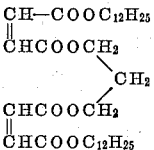

and 3% of nickel stearate, after which the mixture was melted and mixed for 15 minutes at 200° C. The stabilized polypropylene was then remelted at 220° C. and spun to yield monofils of 20 deniers tinged with a light green color. No heat discoloration occurred during the melting and mixing or melt-spinning operations. This sample was subjected to irradiation of ultraviolet rays in a 65° C. Weather-O meter (Toyo Rika Co., Model WE-2). This sample required 220 hours for its inherent viscosity to become 80% of its original value. On the other hand, the time for the monofilaments not containing nickel stearate was 100 hours. In Table XII are summarized the numerical values illustrating the synergistic effect of the stabilizer of this invention.

TABLE XII.—TIME REQUIRED FOR THE INTRINSIC VISCOSITY TO BECOME 80% OF ORIGINAL VALUE BY IRRADIATION IN WEATHER METER

| No. | Stabilizer composition | Time required for the inherent viscosity to become 80%, hr. |
|---|---|---|
| I | 0.15% of 1,1,3-tri(2-methyl-4-hydroxy-5-tert-butylphenyl)-butane. | 60 |
| VI | 0.3% of a complex of dibutyl tin maleate and 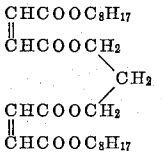 | 60 |
| III | 3% nickel stearate | 20 |
| | I+VI | 100 |
| | I+III | 8 |
| | VI+III | 90 |
| | I+VI+III | 220 |

*Example 22*

When zinc stearate was used instead of the nickel stearate in Example 20, substantially similar results were obtained.

*Example 23*

When monofilaments prepared, as in Example 20, by mixing 0.15% of 1,1,3-tri(2-methyl-4-hydroxy-5-tert-butylphenyl)-butane, 0.3% of a complex of dibutyl tin maleate and the ester of the following formula $$\begin{array}{c} CHCOOC_8H_{17} \\ \| \\ CHCOOCH_2 \\ \diagdown \\ CH_2 \\ \diagup \\ CHCOOCH_2 \\ \| \\ CHCOOC_8H_{17} \end{array}$$

and 3% of nickel stearate, were subjected to irradiation of ultraviolet rays in a weather meter, 200 hours were required for the intrinsic viscosity to become 80% of its original value. In Table XIII are given the numerical values showing the synergistic effect of the stabilizer of this invention.

TABLE XIII

| No. | Stabilizer composition | Time required for the inherent viscosity to become 80%, hr. |
|---|---|---|
| VII | 0.3% of a complex of dibutyl tin maleate and CH—COOC$_8$H$_{17}$ ‖ CHCOOCH$_2$ \ CH$_2$ / CHCOOCH$_2$ ‖ CH—COOC$_8$H$_{17}$ | 50 |
| | I+VII | 90 |
| | III+VII | 90 |
| | I+III+VII | 200 |

*Example 24*

When 4,4'-butylidene bis(3-methyl-6-tert-butylphenol) was used instead of the 1,1,3-tri(2-methyl-4-hydroxy-5-tert-butylphenyl)-butane in Example 20, substantially similar results were obtained.

What we claim is:
1. A reformed dyeable polymer of mono alpha olefin comprising substantially a mixture of
   (1) a polyolefin containing as a dye bonding medium a compound selected from the group consisting of the aliphatic, alicyclic and aromatic monocarboxylates, dicarboxylates, oxycarboxylates, aminocarboxylates, and the beta-diketone, beta-diketone, beta-oxyketone and beta-ketonic acid ester complexes of copper, silver, zinc, cadmium, iron, cobalt and nickel in an amount of 0.02 to 2% in terms of the metallic constituent, based on the weight of said polymer of mono alpha olefin, and
   (2) 0.002–2 percent by weight, based on said polyolefin of one member of the organic tin compounds represented by the formulas

(a)

$$\begin{array}{c} R_1 \\ \diagdown \\ R_2 \end{array} Sn \begin{array}{c} OOC \\ \diagup \quad \diagdown R_3 \\ OOC \end{array}$$

wherein $R_1$ and $R_2$ are alkyl radicals of 1 to 8 carbon atoms and $R_3$ is a member selected from the group consisting of alkylene, alkenylene and phenylene, (b)

$$\begin{array}{c} R_1 \\ \diagdown \\ R_2 \end{array} Sn \begin{array}{c} OOCR_4 \\ \diagup \\ OOCR_5 \end{array}$$

wherein $R_1$ and $R_2$ have the meaning hereinabove given and —OOCR$_4$ and —OOCR$_5$ are members selected from the group consisting of the saturated and unsaturated aliphatic mono- and dicarboxylic acid residues and the half ester residues of said dicarboxylic acids, (c)

$$-\!\!\left(\!\!\begin{array}{c} R_1 \\ | \\ Sn\!-\!OOC\!-\!R_3\!-\!COO \\ | \\ R_2 \end{array}\!\!\right)_{\!\!m}\!\!-$$

wherein $R_1$, $R_2$ and $R_3$ have the meanings hereinabove given and $m$ is an integer of at least 2, (d)

$$R_6\!-\!COO\!-\!\overset{\overset{\displaystyle R_1}{|}}{\underset{\underset{\displaystyle R_2}{|}}{Sn}}\!-\!OOC\!-\!R_3\!-\!COO\!-\!\overset{\overset{\displaystyle R_1}{|}}{\underset{\underset{\displaystyle R_2}{|}}{Sn}}\!-\!OOCR_7$$

wherein $R_1$, $R_2$ and $R_3$ have the meanings hereinabove given and $R_6$ and $R_7$ are alkyl radicals of 1 to 18 carbon atoms, and (e) a reaction product of the compounds having the formulas $$\begin{array}{c} R_1 \\ \diagdown \\ R_2 \end{array} Sn \begin{array}{c} OOCH \\ \diagup \quad \| \\ OOCH \end{array}$$

and $$\begin{array}{c} CHCOOR_8 \\ \| \\ CHCOO \\ \diagdown \\ \quad\quad\quad X \\ CHCOO \diagup \\ \| \\ CHCOOR_9 \end{array}$$

wherein $R_1$ and $R_2$ have the meaning hereinabove defined, $R_8$ and $R_9$ are alkyl radicals of 4–18 carbon atoms and X is an alkylene radical of 2 to 4 carbon atoms.

2. A composition according to claim 1 in which said organic tin compound is dibutyl tin maleate-laurate.

3. A composition according to claim 1 in which said organic tin compound is dioctyl tin sebacate.

4. A composition according to claim 1 in which said organic tin compound is a reaction product of dibutyl tin maleate with a compound of the following formula $$\begin{array}{c} CH\!-\!COOC_{12}H_{25} \\ \| \\ CH\!-\!COO \\ \diagdown \\ \quad\quad\quad (CH_2)_2 \\ CHCOO \diagup \\ \| \\ CH\!-\!COOC_{12}H_{25} \end{array}$$

5. A shaped article of reformed dyeable polyolefins obtained by melt molding the composition of claim 1 at a temperature above 200° C.

6. A composition according to claim 1 in which said polyolefin is polypropylene.

7. A composition according to claim 1 in which said dye bonding medium is nickel stearate.

8. A composition according to claim 1 in which said dye bonding medium is zinc stearate.

9. A reformed dyeable polymer of mono alpha olefin comprising substantially a mixture of
   (1) a polyolefin containing as a dye bonding medium a compound selected from the group consisting of the aliphatic, alicyclic and aromatic monocarboxylates, dicarboxylates, oxycarboxylates, aminocarboxylates, and the beta-diketone, beta-diketone, beta-oxyketone and beta-ketonic acid ester complexes of copper, silver, zinc, cadmium, iron, cobalt and nickel in an amount of 0.02 to 2% in terms of the metallic constituent, based on the weight of said polymer of mono alpha olefin, and
   (2) 0.002–2 percent by weight, based on said polyolefin, of one member of the organic tin compounds represented by the formulas (a)

$$\begin{array}{c} R_1 \\ \diagdown \\ R_2 \end{array} Sn \begin{array}{c} OOC \\ \diagup \quad \diagdown R_3 \\ OOC \end{array}$$

wherein $R_1$ and $R_2$ are alkyl radicals of 1 to 8 carbon atoms and $R_3$ is a member selected from the group consisting alkylene, alkenylene and phenylene, (b)

$$\begin{array}{c} R_1 \\ \diagdown \\ R_2 \end{array} Sn \begin{array}{c} OOCR_4 \\ \diagup \\ OOCR_5 \end{array}$$

wherein $R_1$ and $R_2$ have the meaning hereinabove given and —OOCR$_4$ and —OOCR$_5$ are members selected from the group consisting of the saturated and unsaturated aliphatic mono- and dicarboxylic acid residues and the half ester residues of said dicarboxylic acids, (c)
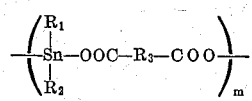

wherein $R_1$, $R_2$ and $R_3$ have the meanings hereinabove given and $m$ is an integer of at least 2, (d)
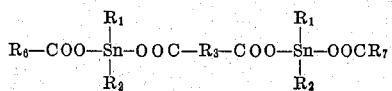

wherein $R_1$, $R_2$ and $R_3$ have the meanings hereinabove given and $R_6$ and $R_7$ are alkyl radicals of 1 to 18 carbons atoms, and (e) a recation product of the compounds having the formulas

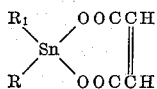

and

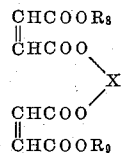

wherein $R_1$ and $R_2$ have the meaning hereinabove defined, $R_8$ and $R_9$ are alkyl radicals of 4–18 carbon atoms and X is an alkylene radical of 2 to 4 carbon atoms, and (3) 0.05–0.5 percent by weight, based on said polymer of mono alpha olefin, of an alkylphenol type antioxidant selected from the group consisting of monophenolic antioxidant, methylene-bis-phenolic antioxidant and tris phenolic antioxidant.

10. A composition according to claim 9 in which said mono-phenolic antioxidant is di-tert-butyl-p-cresol.

11. A composition according to claim 9 in which said methylene-bis-phenolic antioxidant is a compound selected from the group consisting of 2,2'-methylene-bis(4-methyl-6-tert-butylphenol), 4,4'-methylene-bis(2,6 - di-tert-butylphenol), 2,6-bis(2'-hydroxy-3'-tert-butyl - 5'-methylbenzyl)-4-methylphenol, 2,2'-methylene-bis(4-methyl-6-cyclohexylphenol) and 4,4'-methylene-bis(2-methyl - 6 - tert-butylphenol).

12. A composition according to claim 9 in which said tris-phenolic antioxidant is 1,1,3-tris(2-methyl-4-hydroxy-5-tert-butylphenol) butane.

13. A composition according to claim 9 in which said bonding medium is nickel stearate.

14. A composition according to claim 9 in which said bonding medium is zinc stearate.

15. A composition according to claim 9 in which said alkylphenol type antioxidant is di-n-octadecyl ester of (4-hydroxy-3,5-di-tert-butyl)benzyl phosphonic acid.

References Cited by the Examiner

UNITED STATES PATENTS 2,984,634   5/1961   Caldwell et al. _____ 260—23
3,217,004   11/1965  Hechenbleikner et al. _ 260—23.75

LEON J. BERCOVITZ, *Primary Examiner.*

R. W. RAUCHFUSS, *Assistant Examiner.*